US006673993B2

(12) United States Patent
Miller

(10) Patent No.: US 6,673,993 B2
(45) Date of Patent: Jan. 6, 2004

(54) SOUNDING BLOCK FOR A DRUM

(75) Inventor: Russell Miller, Chatsworth, CA (US)

(73) Assignee: Yamaha Corporation, Shizuoka (JP)

( * ) Notice: Subject to any disclaimer, the term of this patent is extended or adjusted under 35 U.S.C. 154(b) by 0 days.

(21) Appl. No.: 09/894,708

(22) Filed: Jun. 28, 2001

(65) Prior Publication Data

US 2003/0000366 A1 Jan. 2, 2003

(51) Int. Cl.[7] .................................. G01D 13/02
(52) U.S. Cl. .................................. 84/411 R
(58) Field of Search .................................. 84/411 R, 411 A, 84/411.4, 411 P

(56) References Cited

U.S. PATENT DOCUMENTS 4,567,807 A * 2/1986 Robinson ................. 84/411 M
5,854,436 A * 12/1998 Wernick ................. 84/411 P
6,284,959 B1 * 9/2001 Nicolosi ................. 359/291

* cited by examiner

*Primary Examiner*—Kim Lockett
(74) *Attorney, Agent, or Firm*—Koda & Androlia

(57) ABSTRACT

A sounding block for a drum including a block which is generally rectangular when viewed from a front side and curved when viewed from a top side and an attachment device for adjustably attaching the block to a periphery of a drum. The curvature of the block substantially corresponds to a curvature of a periphery of a drum to which the block is to be attached.

9 Claims, 3 Drawing Sheets

SOUNDING BLOCK FOR A DRUM

BACKGROUND OF THE INVENTION

1. Field of the Invention

The present invention relates to drums and more particularly to accessories or peripherals which are utilized together with drums.

2. Prior Art

When playing a conventional drum, such as a snare drum, it is desirable to make other sounds beside just the drumming sound caused by hitting the drum head. To achieve these other sounds, drummers hit the rim of the drums with the drum stick (a rim shot). This produces a different sound than the sound of the drum stick contacting the head of the drum, but the sound is relatively limited and somewhat metallic. Accordingly, it is desired that the drum be capable of producing a wider range of sounds.

SUMMARY OF THE INVENTION

Accordingly, it is the general objects of the present invention to provide an accessory or peripheral for a drum which allows the range of sounds which can be made by a drum to be increased.

It is still another object of the present invention to provide such a means which is easy to attach and can be provided in plural numbers on the drum.

In keeping with the objects of the present invention, a unique device is provided. In particular, this unique device is a sounding block for easy detachment to and detachment from a drum. Such a sounding block as in the present invention includes a block and a means for attaching the block to a drum. Still further, the block is substantially rectangular when viewed from the front side, curved when viewed from the top side and a curvature of the block substantially corresponds to a curvature of a periphery of the drum to which it is attached The block can be made from various materials such as solid wood, plywood, resins, etc. Still further, the block may be provided with bells such as one would normally find in a tambourine. Still further, more than one block or type of sounding block could be attached to the drum at different places.

BRIEF DESCRIPTION OF THE DRAWINGS

The above-mentioned features and objects of the present invention will become more apparent with reference to the drawings to the description taken together with the drawings wherein like reference, numerals, general like elements and in which.

DETAILED DESCRIPTION OF THE INVENTION

Figure 1A:
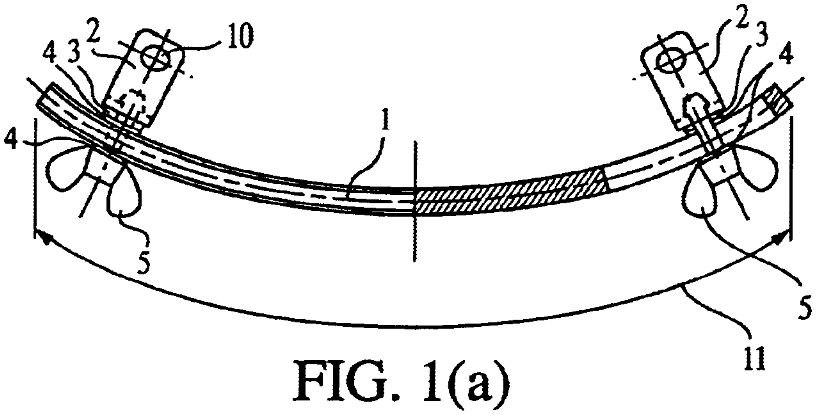
FIGS. 1(*a*), 1(*b*) and 1(*c*) are respectively top, front and side views of a first embodiment of the sounding block in accordance with the teachings of the present invention.
Figures 1B, 1C:
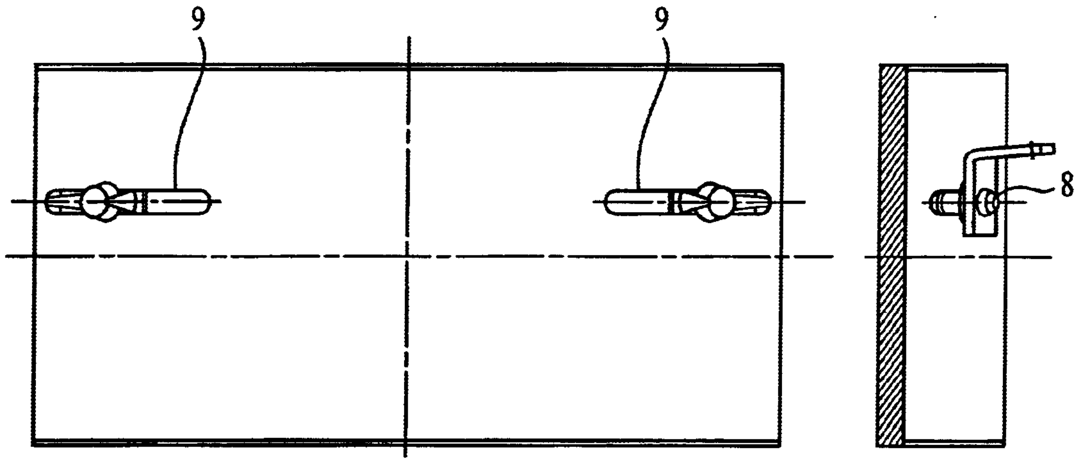
Figure 2A:
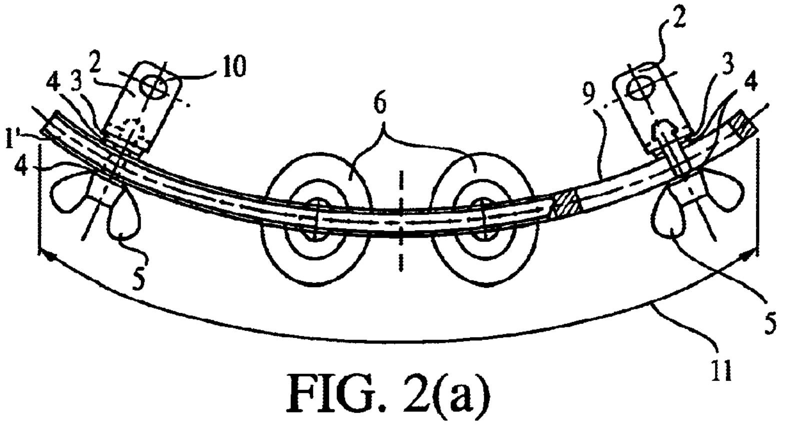
FIGS. 2(*a*), 2(*b*) and 2(*c*) are respectively top, front and side views of a second embodiment of the present invention.
Figure 2B:
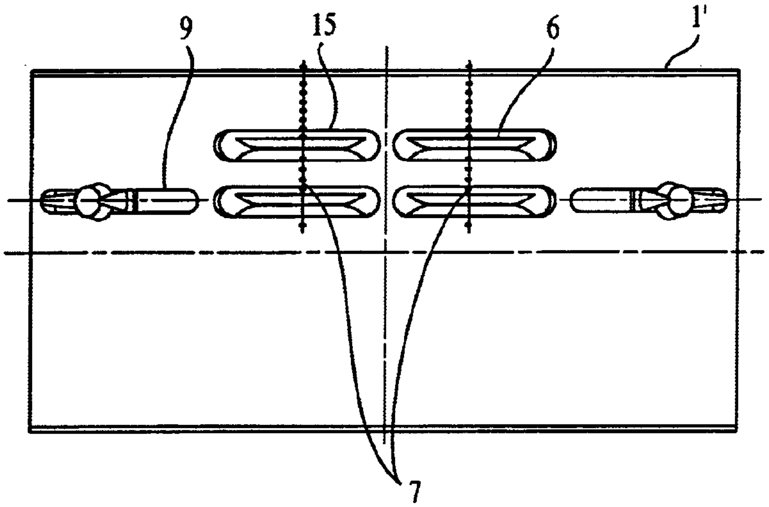
Figure 2C:
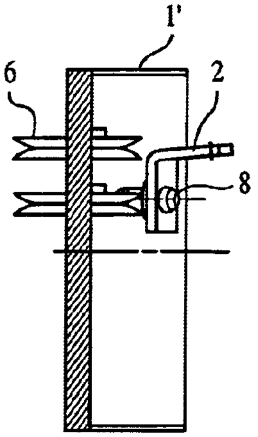

Referring to FIGS. 1(*a*)–1(*c*), shown therein is a first embodiment of the sounding block of the present invention. The sounding block of the present invention comprises a block 1 which is generally rectangular when viewed from the front side and curved when viewed from the top side. The curvature 11 of the block 1 is substantially the same as the curvature of the periphery of a drum to which the block 1 is to be attached. Still further, the block 1 may be made from solid woods, plywoods, resins, etc. The type of material from which the block 1 is made and the size of the block will affect the sound produced when the block 1 is struck by the drum stick. Particularly, the larger the block, the lower the sound. The block ranges in size from a height of approximately 57 mm to 114 mm, a thickness of 10 to 20 mm and the length of the block along the curvature 11 is approximately 236 to 250 mm.

The block 1 is attached to a drum by means of attachment means. A typical attachment means would comprise elongated slots 9 formed in the block 1. A screw 8 is provided which extends through an L-shaped bracket 2, a washer 3 made from a sound deadening materials such as rubber or felt, a metal washer 4, the slotted hole 9, a metal washer 4 and a wing nut 5 screwed onto the end of the screw 8. The L-shaped bracket 2 is further provided with a hole 10 for attaching to a drum head tensioning screw of the drum. The sound deadening washer 3 is provided for the purpose of reducing the effects of vibration of the drum upon the sound of the block 1 and vice-versa.

Figure 3:
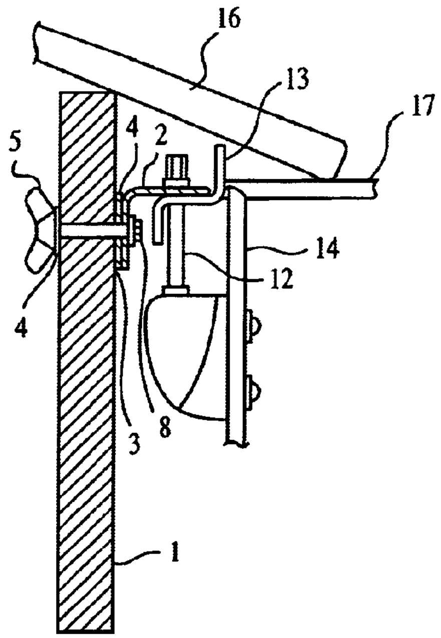
FIG. 3 is a side view illustrating a block and a drum wherein the block is shown in cross section and the drum is shown in partial section.

As is shown in FIG. 3, the block 1 is attached to the drum by means of inserting the drum head tensioning screw 12 through the hole 10 with the rim 13 of the drum in between. Still further, depending upon the size and curvature of the drum 14 and/or spacing of the drum head tensioning screws 12, the wing nuts 5 can be loosened and the screws 8 moved within the elongated holes 9 in the block 1. Also, the block 1 is mounted to the drum so that the top portion thereof projects above the top of the rim 13. Typically, it projects above approximately 3 inch above the rim 13.

After attachment to the drum 14, a person playing the drum 14 can either strike the rim 13, the block 1 or the rim 13 and the block 1 at the same time with the drum stick 16 in addition to merely hitting the drum head 17 with the stick 16 all by itself. Such various hits will produce a variety of different sounds for the amusement of the drummer and his audience.

Referring to 2(*a*)–2(*c*), shown therein is a second embodiment of the present invention. In this embodiment, those elements which are substantially the same as in the first embodiment are given a like reference numerals and perform the same function. However, this second embodiment is for the purpose of providing an additional sound for the sounding block which can be likened to a tambourine.

To provide the tambourine-like sound, a plurality of slots 15 are provided in the block 1'. Bells 6 such as one would find in a tambourine are provided in the slots 15 and shaft 7 are provided in the block 1' extending through the slots 15 and the bells 6.

Except for the addition of the bells 6 in the slots 15 of the sounding block of the block 1', the invention of the second embodiment performs substantially the same as the first embodiment. However, by striking the block with the drum stick 16 when the block 1' is attached to the drum 14, a tambourine-like sound can be further produced.

Figure 4:
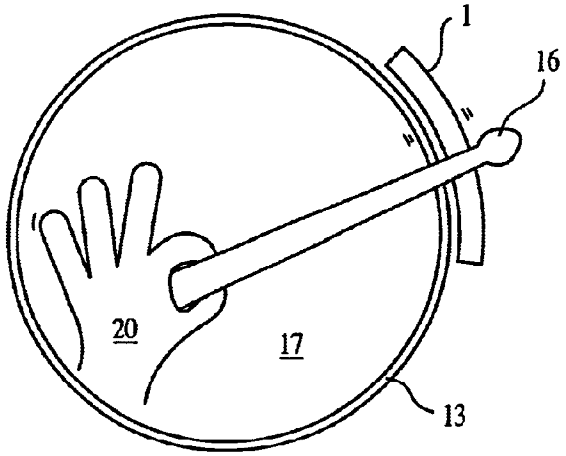
FIG. 4 is a top view of a drum with present invention installed thereon illustrating the stick position.
Figure 5:
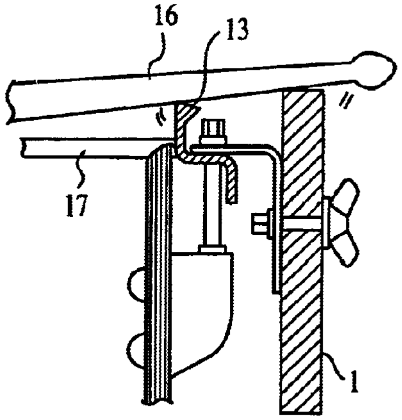
FIG. 5 is a side view illustrating a block in a drum wherein the block is shown in cross-section and the drum is shown in partial section to illustrate the cross-stick position.

Referring to FIGS. 4 and 5, shown therein is the block 1 of the present invention attached to the outer circumference of the rim 13 of a drum so as to be arranged at a cross-stick position so that the player 20 is able to also produce cross-stick sounds.

In order to produce cross-stick sounds, the player 20 holds the stick 16 with his thumb and point finger with the other fingers spread out on the drum head 17, thus forming a bridge. Then, player 20 raises the stick 16 with the butt end of the stick 16 that is positioned closest to the player 20 kept in touch with the drum head 17. The player 20 then downs the stick 16 towards the rim 13. The stick 16 as a result hits against the rim 13 and the block 1 of the present invention, producing the sounds of the rim 13 and block 1 at the same time. With a metal rim 13 and a wooden block 1, it is possible to produce a "metallic" and a "woody" sound simultaneously with the present invention.

In addition, it should be clear that by providing a drum with multiple blocks such as the first and second embodiments, additional options for a variety of sounds to be produced can be provided for the drummer and for the enjoyment of the audience.

It should be apparent to those skilled in the art that the above-described embodiments are but a few of the many possible preferred embodiments which fall within the scope and content of the present invention. Numerous and various other arrangements can be readily devised by those skilled in the art without departing from the spirit and scope of the invention.

I claim:

1. A sounding block for a drum, said sounding block comprising:

a block; and a means for attaching said block to a drum; and wherein:

said block is substantially rectangular when viewed from a front side;

said block is curved when viewed from the top side; and a curvature of the block substantially corresponds to a curvature of the periphery of said drum to which it is attached.

2. The sounding block according to claim 1, wherein said means for attaching said block to a drum is provided with means for varying the attachment point.

3. The sounding block according to claim 2, wherein said means for varying the attachment point comprises at least one elongated slot provided in said block.

4. The sounding block according to claim 2, wherein said attachment means comprises an L-shaped bracket which is attached to the block by means of a screw extending through said elongated hole and a butterfly nut.

5. The sounding block according to claim 4, wherein said attachment means further comprises a sound isolating means provided between the L-shaped bracket and the block.

6. The sounding block according to claim 1 further comprising bells provided in said block.

7. The sounding block according to claim 6, wherein said bells are provided in slots formed in said block.

8. The sounding block according to claim 1, wherein the block is made from a material selected from the groups consisting of solid wood, ply wood and resins.

9. The sounding block according to claim 1, wherein the means for attaching attaches the block to the drum such that the block extends above a rim of the drum.

* * * * *